US012619295B2

(12) United States Patent
Painter et al.

(10) Patent No.: US 12,619,295 B2
(45) Date of Patent: May 5, 2026

(54) POWER SUPPLY WITH OVERCURRENT PROTECTION BASED ON SYSTEM BIOS SETTING

(71) Applicant: Lenovo (Singapore) Pte. Ltd., New Tech Park (SG)

(72) Inventors: Alan L. Painter, Apex, NC (US); Omar Ali, Cary, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 38 days.

(21) Appl. No.: 18/325,450

(22) Filed: May 30, 2023

(65) Prior Publication Data

US 2024/0402784 A1 Dec. 5, 2024

(51) Int. Cl.
*G06F 1/30* (2006.01)

(52) U.S. Cl.
CPC .................................... *G06F 1/305* (2013.01)

(58) Field of Classification Search
CPC . G06F 1/305; G06F 1/26; G06F 1/266; G06F 9/44505
USPC ......................................................... 713/340
See application file for complete search history.

(56) References Cited

U.S. PATENT DOCUMENTS

| | | | | |
|---|---|---|---|---|
| 7,877,622 | B2 * | 1/2011 | Gruendler | ........... G06F 11/2015 |
| | | | | 307/64 |
| 10,264,643 | B1 * | 4/2019 | Shi | ......................... H05B 47/25 |
| 10,530,356 | B2 * | 1/2020 | Li | ....................... H03K 17/0822 |
| 10,761,858 | B2 * | 9/2020 | Ganesan | ............. G06F 9/44505 |
| 11,397,593 | B1 * | 7/2022 | Lin | ...................... G06F 9/44505 |
| 2014/0159497 | A1 * | 6/2014 | Chen | ....................... G06F 1/188 |
| | | | | 307/82 |
| 2015/0046727 | A1 * | 2/2015 | Kobayashi | .............. G06F 1/266 |
| | | | | 713/300 |
| 2016/0378175 | A1 * | 12/2016 | Wu | ........................ G06F 1/3296 |
| | | | | 713/320 |
| 2019/0065295 | A1 * | 2/2019 | Hsieh | ..................... G06F 3/0625 |
| 2020/0257348 | A1 * | 8/2020 | Wanner | ..................... G06F 1/28 |
| 2020/0278732 | A1 * | 9/2020 | Horvath | .................... G06F 1/28 |
| 2021/0281063 | A1 * | 9/2021 | Chih | ........................ G06F 1/266 |
| 2023/0205301 | A1 * | 6/2023 | Duenas | ................. G06F 1/3234 |
| | | | | 713/300 |

OTHER PUBLICATIONS

"Avoid Power Related Damage—Using Overcurrent Protection with a Multiple Output Power Supply"—White Paper published by Keysight Technologies on Oct. 10, 2018; 4 Pages (Year: 2018).*

* cited by examiner

*Primary Examiner* — Brian T Misiura
(74) *Attorney, Agent, or Firm* — Kunzler Needham & Hilton

(57) ABSTRACT

An apparatus, system, and method are disclosed for automatically controlling a power setting of a power supply unit (PSU). The apparatus includes a processor and non-volatile memory having a switch configured to instruct the PSU to operate in a first overcurrent protection (OCP) mode.

20 Claims, 4 Drawing Sheets

300

```
                    BIOS SETUP UTILITY
                       Advanced
  Manufacturer : Intel
  Brand String  : Intel® Core™ i7 CPU          870
  Frequency    : 2.93GHz
  BCLK Speed : 133MHz
  Cache L1    : 256 KB
  Cache L2    : 1024 KB
  Cache L3    : 8192 KB
  Ratio Status : Unlocked (Min:09, Max: 22)
  Ratio Actual Value : 22
  CPUID        : 106E5
  PSU OCP (15A) Setting        [Enabled]
  CPU Ratio Setting            [22.0]         ◄►   Select Screen
  C1E Support                  [Enabled]      ▲▼   Select Item
  Hardware Prefetcher          [Enabled]      +-   Change Option
  Adjacent Cache Line Prefetch [Enabled]      F1   General Help
  Max CPUID Value Limit        [Enabled]      F10  Save and Exit
  Intel® Virtualization Tech   [Enabled]      ESC  Exit
```

302

100

104

MEMORY

102

PROCESSOR

108

106

EMBEDDED CONTROLLER

POWER SUPPLY UNIT

300

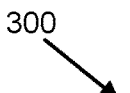

```
                        BIOS SETUP UTILITY
                            Advanced
┌────────────────────────────────────────────────┬──────────────────────────┐
│ Manufacturer : Intel                             │                          │
│ Brand String : Intel® Core™ i7 CPU      870      │                          │
│ Frequency    : 2.93GHz                           │                          │
│ BCLK Speed : 133MHz                              │                          │
│ Cache L1     : 256 KB                            │                          │
│ Cache L2     : 1024 KB                           │                          │
│ Cache L3     : 8192 KB                           │                          │
│ Ratio Status : Unlocked (Min:09, Max: 22)        │                          │
│ Ratio Actual Value : 22                          │                          │
│ CPUID        : 106E5                             │                          │
│ PSU OCP (15A) Setting         [Enabled]          │                          │
│ CPU Ratio Setting             [22.0]             │ ◄►   Select Screen       │
│ C1E Support                   [Enabled]          │ ▲▼   Select Item         │
│ Hardware Prefetcher           [Enabled]          │ +-   Change Option       │
│ Adjacent Cache Line Prefetch  [Enabled]          │ F1   General Help        │
│ Max CPUID Value Limit         [Enabled]          │ F10   Save and Exit      │
│ Intel® Virtualization Tech    [Enabled]          │ ESC   Exit               │
└────────────────────────────────────────────────┴──────────────────────────┘
```

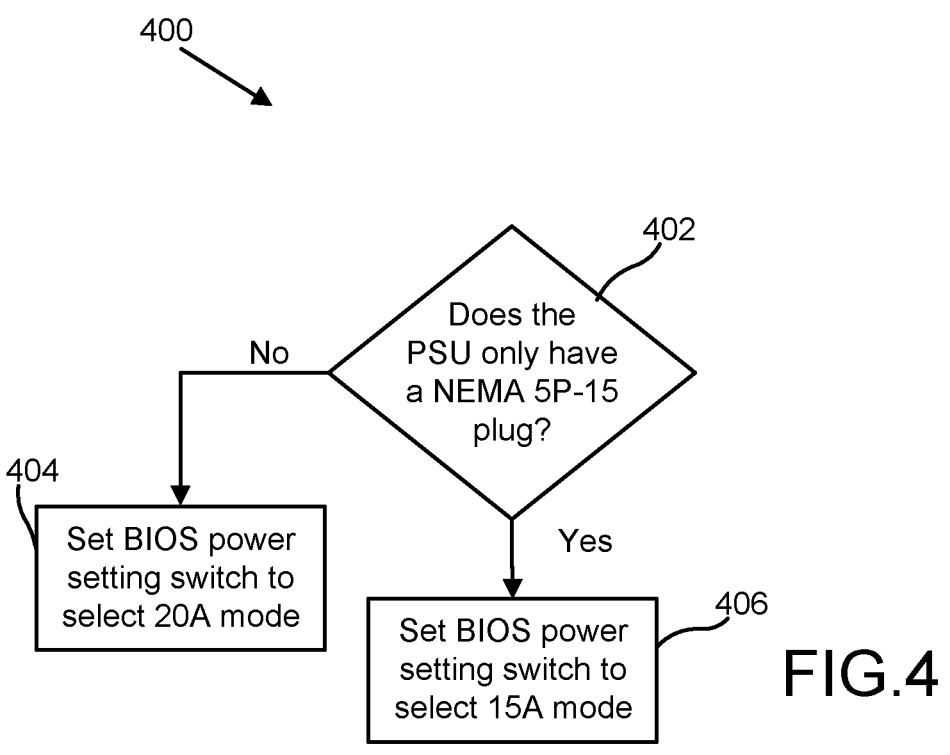

402

Does the PSU only have a NEMA 5P-15 plug?

No

Yes

404

Set BIOS power setting switch to select 20A mode

406

Set BIOS power setting switch to select 15A mode

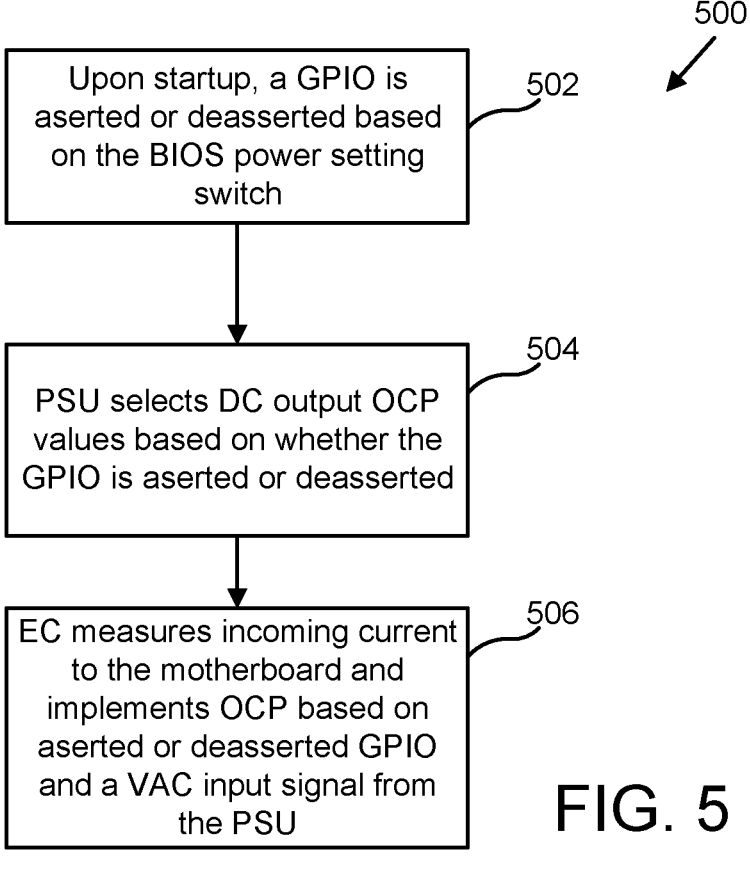

502

Upon startup, a GPIO is aserted or deasserted based on the BIOS power setting switch

504

PSU selects DC output OCP values based on whether the GPIO is aserted or deasserted

506

EC measures incoming current to the motherboard and implements OCP based on aserted or deasserted GPIO and a VAC input signal from the PSU

FIG. 5

POWER SUPPLY WITH OVERCURRENT PROTECTION BASED ON SYSTEM BIOS SETTING

BACKGROUND

This invention relates to computer system configuration management and more particularly relates to overcurrent protections.

Power management becomes particularly important for computer workstations, which must rely upon a power source of the facility where the computer workstations are used.

SUMMARY

Methods, apparatuses, and systems are disclosed for automatically controlling a power setting of a power supply unit (PSU). In one embodiment, the apparatus includes a processor and non-volatile memory having a switch configured to instruct the PSU to operate in a first overcurrent protection (OCP) mode.

In another embodiment, a system includes a processor, a power supply unit (PSU) coupled to the processor, and non-volatile memory comprising a switch configured to instruct the PSU to operate in a first overcurrent protection (OCP) mode.

In another embodiment, a method includes instructing a power supply unit (PSU) of a computer system to operate in a first overcurrent protection (OCP) mode based on a switch setting stored in non-volatile memory in the computer system and activating the switch upon start-up of the computer system.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 3 is a screen shot of a basic input/output system (BIOS) setup utility according to an embodiment;

FIG. 4 is a schematic block diagram illustrating one embodiment of a method for a configuration module according to an embodiment; and FIG. 5 is a schematic flow chart diagram illustrating one embodiment of a method for a configuration module according to an embodiment.

DETAILED DESCRIPTION OF THE INVENTION

Figure 1:
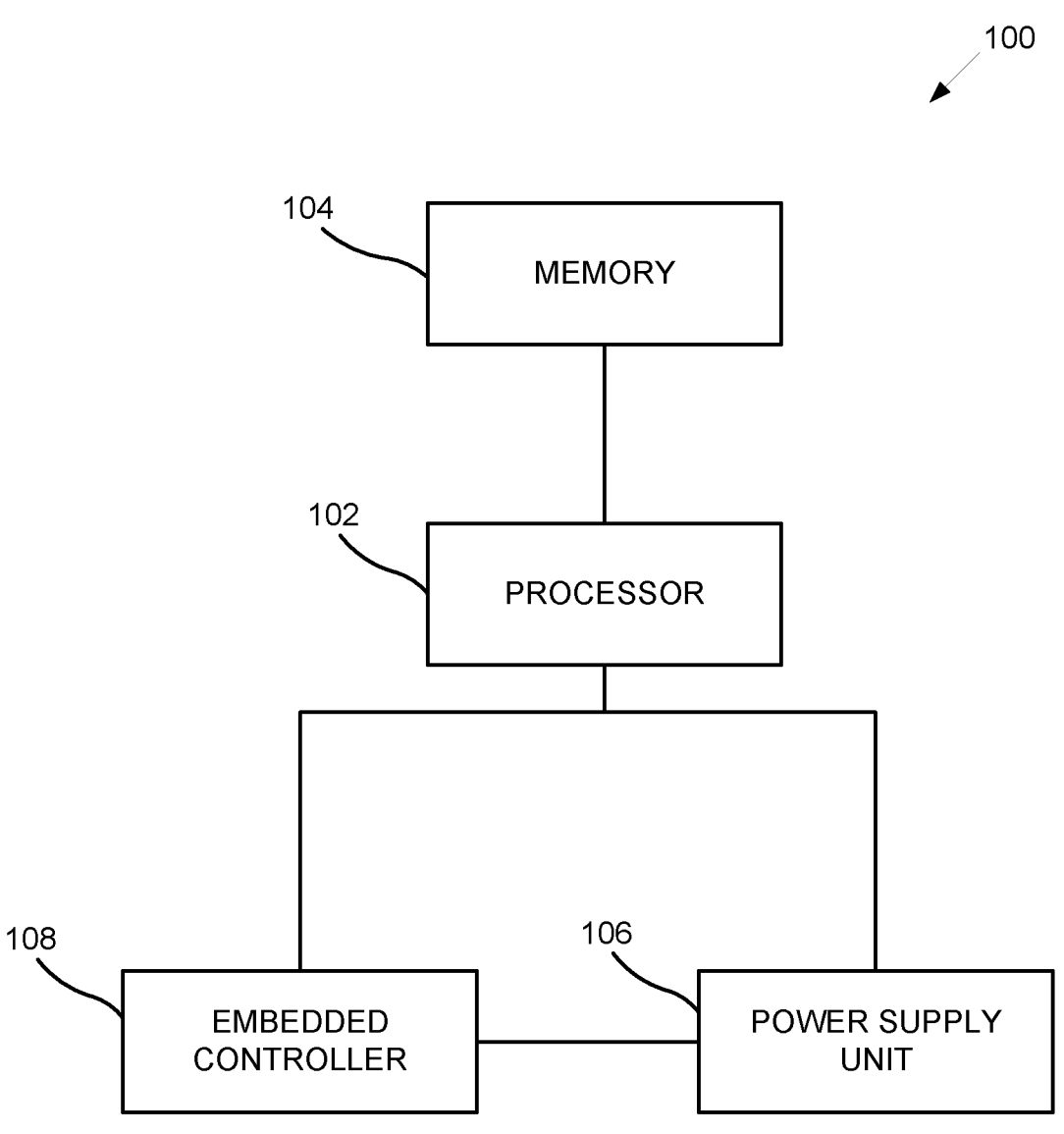
FIG. 1 is a schematic block diagram illustrating a possible computer system according to an embodiment.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 is a schematic block diagram of the computer system 100 which is configurable to change overcurrent protection (OCP) limits depending upon the type of connector used by a power supply unit (PSU) 106. The computer system 100 includes at least a processor or a plurality of processor 102 (e.g., a central processing unit (CPU), a graphics processing unit (GPU), or the like), a memory 104, the PSU 106, and a motherboard embedded controller (EC) 108.

In one embodiment, there may be different types of processors 102 having differing predetermined levels of power consumption. In an embodiment, the processors 102 may have different possible physical implementations, such as multi-chip, single chip, multi-core, hyperthreaded processors, and the like. Components of the computer system 100 receive power from the PSU 106. The PSU 106 may receive power from up to two or more predetermined types of power sources. In the example shown, one type of power source may arrive via a 20 amp (A) circuit and another type of power source may arrive via a 15 A circuit.

The memory 104 may be of any size or organization and may include both read/write and read-only sections. It may also include both global and local sections and may support both uniform and non-uniform access. It may incorporate memory-mapped I/O and direct memory access.

The EC 108 controls operations of components located on a motherboard. The EC 108 receives signals from the processor 102 and/or the PSU 106 for controlling motherboard components so as not to overload the PSU 106.

An exemplary computer system 100 may be a desk-side tower workstation configured to consume over 1250 watts (W) via the PSU 106 having a C20 receptacle (i.e., 20 A input) using a national electrical manufacturers association (NEMA) 5-20P plug. However, not all customer configurations and/or environments can support a NEMA 5-20P plug. For example, a residential location may only include 120 volt (V), 15 A outlets. Thus, the computer system 100 is configurable to be useable with the PSU 106 coupled to a 15 A input using a NEMA 5-15P plug. The processor 102 upon executing instructions stored in the memory 104 allows the use of a standard NEMA 5-15P plug by signaling to the PSU 106 to use an alternate OCP threshold (i.e., limits or values) that aligns with a 15 A input.

Figure 2:
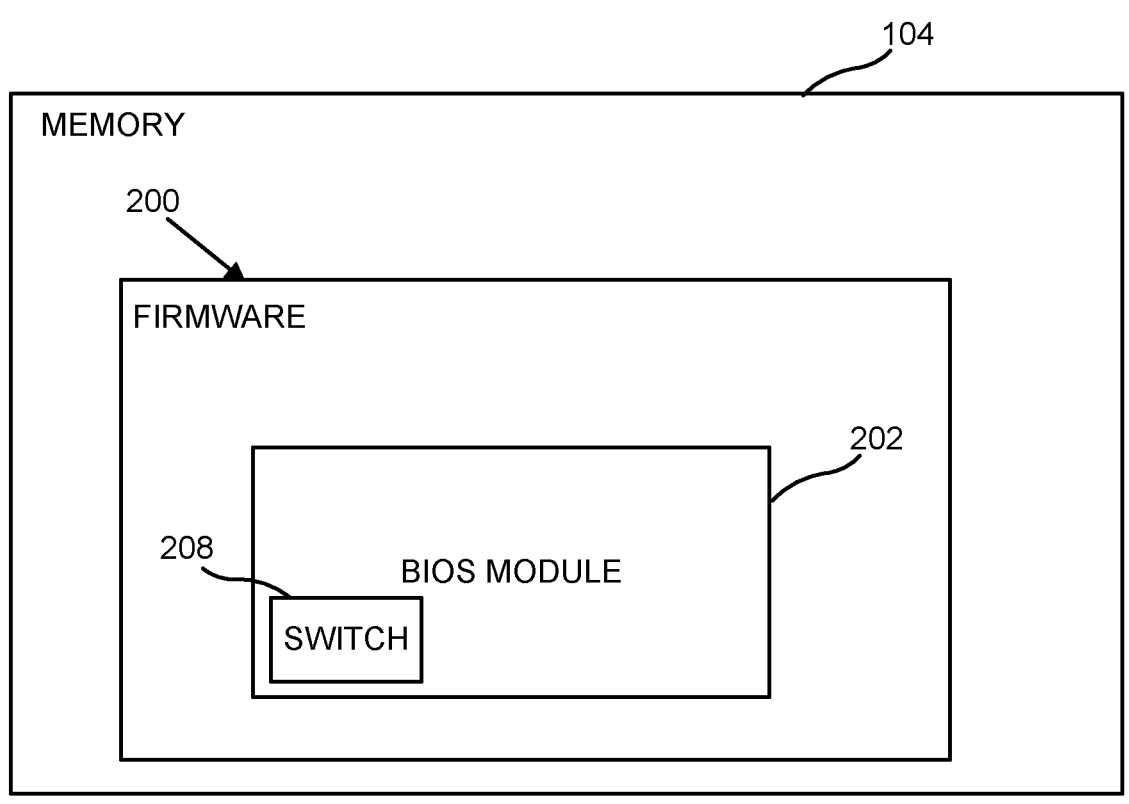
FIG. 2 is a schematic block diagram of memory components according to an embodiment.

In various embodiments, referring to FIG. 2, the memory 104 includes instructions stored on non-transitory computer readable medium. The instructions are stored in software and firmware 200. The firmware 200 includes a configurable basic input/output system (BIOS) module 202 used to start the computer system 100 and to manage data flow between an operating system of the computer system 100 and attached devices. The BIOS module 202 includes a BIOS power setting switch 208 that may indicate any of the following:

assertion of a first or a second over-current protection (OCP) mode; or deassertion of the first or a second over-current protection (OCP) mode.

The BIOS power setting switch 208 may be set by a manufacturer of the computer system 100 or a user. The BIOS power setting switch 208 may be defaulted to either the 15 A mode or the 20 A mode. Referring to FIG. 3, in one embodiment, applying a label of "Enabled" to the BIOS power setting switch 208 within a BIOS setup utility 300 will set the 15 A mode.

In one embodiment, the BIOS power setting switch 208 causes the computer system 100 to assert or deassert a general-purpose input/output (GPIO) to the PSU 106, thus allowing the PSU 106 to select appropriate DC output OCP values. The EC 108 may also receive the asserted or deasserted GPIO along with a low voltage alternating current (VAC) input signal from the PSU 106. In response, the EC 108 measures incoming current to the motherboard and implements an associated OCP. OCP values for the 20 A mode allow a maximum of 20 A or less AC input current, accounting for power factor, efficiency, and AC voltage detected by the PSU 106. Likewise, the 15 A mode allows a maximum of 15 A or less AC input current. The 20 A mode is used, when a NEMA 5-20P power cord is configured with the system. The 15 A mode is used, when a NEMA 5-20P power cord is configured with the system.

With regard to power limitation, the EC 108 may detect if the BIOS is set in 15 A mode and if only one PSU 106 is installed. If both of those conditions are true, then the EC 108 monitors current coming into the motherboard to duplicate the OCP triggers of the PSU 106. If the current is high for too long, the EC 108 will first try to reduce current by asserting PROC_HOT on a CPU and POWER_BRAKE on a GPU(s).

In various embodiments, the firmware 200 may include microcode, which may reside in a microstore of the processor(s) 102. In an embodiment, the firmware 200 may include low-level software, which may reside in memory 104. In one embodiment, the firmware 200 may include a rudimentary operating system. In a further embodiment, the firmware 200 may support virtualization so as to permit concurrent operation of multiple operating systems on a computer system 100.

FIG. 4 is a schematic flow chart diagram illustrating one embodiment of a method 400 for configuring a computer system to be used with different power connection configurations. The method 400 starts at a decision block 402 where a manufacturer or a user of the computer system determines if a PSU of the computer system includes a NEMA 5-15P plug. If the computer system includes a NEMA 5-15P plug, at a block 406, the manufacturer or the user sets a BIOS power setting switch to select a 15 A mode. If the PSU does not include a NEMA 5-15P plug (but a NEMA 5-20P plug), at a block 404, the manufacturer or the user sets the BIOS power setting switch to select a 20 A mode or leaves the BIOS power setting switch in a default state which is the 20 A mode.

FIG. 5 is a schematic flow chart diagram illustrating one embodiment of a method 500 for automatically configuring the computer system based on the settings applied in method 400. At a block 502, the computer system upon startup, a GPIO is asserted or deasserted based on the BIOS power setting switch. At a block 504, the PSU selects direct current (DC) output OCP values based on whether the GPIO is asserted or deasserted. At a block 506, an EC of the computer system measures incoming current to a motherboard and implements OCP based on the asserted or deasserted GPIO and a VAC input signal from the PSU.

EMBODIMENTS

A. An apparatus comprising: a processor; and a non-volatile memory comprising a switch configured to instruct the PSU to operate in a first overcurrent protection (OCP) mode.

B. The apparatus of A, wherein the switch is included in a basic input/output system (BIOS) module.

C. The apparatus of A or B, wherein the OCP mode is a 15 A mode.

D. The apparatus of C, wherein the OCP mode is a 20 A mode.

E. The apparatus of any of A-D, further comprising a motherboard embedded controller (EC) coupled to the processor, wherein the switch is configured to instruct the EC to operate in one of a plurality OCP modes.

F. The apparatus of E, wherein the EC is configured to use an OCP threshold associated with a 15 A input responsive to the OCP mode being a 15 A mode.

G. A system comprising: a processor; a power supply unit (PSU) coupled to the processor; non-volatile memory comprising a switch configured to instruct the PSU to operate in a first OCP mode.

H. The system of G, wherein the switch is included in a basic input/output system (BIOS) module.

I. The system of G or H, wherein the OCP mode is a 15 A mode.

J. The system of I, wherein the OCP mode is a 20 A mode.

K. The system of I or J, wherein the PSU is configured to use an OCP threshold associated with a 15 A input responsive to the OCP mode being the 15 A mode.

L. The system of any of G-K, further comprising a motherboard embedded controller (EC) coupled to the processor, wherein the switch is configured to instruct the EC to operate in one of a plurality OCP modes.

M. The system of L, wherein the EC is configured to use an OCP threshold associated with a 15 A input responsive to the OCP mode being a 15 A mode.

N. A method comprising instructing a power supply unit (PSU) of a computer system to operate in a first OCP mode based a switch setting stored in non-volatile memory in the computer system and activating the switch upon start-up of the computer system.

O. The method of N, wherein the switch is included in a basic input/output system (BIOS) module.

P. The method of N or O, wherein the OCP mode is a 15 A mode.

Q. The method of P, wherein the OCP mode is a 20 A mode.

R. The method of P, further comprising at the PSU, using an OCP threshold associated with a 15 A input responsive to the OCP mode being the 15 A mode.

S. The method of any of N-R, further comprising instructing a motherboard embedded controller (EC) to operate in one of a plurality overcurrent protection (OCP) modes.

T. The method of S, further comprising, at the EC, using an OCP threshold associated with a 15 A input responsive to the OCP mode being a 15 A mode.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus, comprising:
   a processor; and
   a non-volatile memory configured to store code that, when executed by the processor, causes the processor to:
      receive a power setting of a plurality of different power settings for the apparatus prior to startup of the apparatus, wherein each different power setting in the plurality of different power settings corresponds to a type of power plug of a plurality of different types of power plugs that receive power from a power source for powering the apparatus,
      set, in a basic input/output system (BIOS) setup utility prior to startup of the apparatus, an overcurrent protection (OCP) mode of a plurality of different OCP modes corresponding to the received power setting, wherein:
         the OCP mode set in the BIOS setup utility protects the apparatus from overcurrent in the power supplied by the power source and received via the type of power plug, and
         each OCP mode in the plurality of different OCP modes corresponds to a power setting in the plurality of different power settings, and
      instruct, at startup of the apparatus, a power supply unit (PSU) for the apparatus to operate in the OCP mode set in the BIOS setup utility,
   wherein:
      the apparatus is configurable for being powered by each different type of power plug,
      each different type of power plug is based on a maximum amount of power supplied by the corresponding type of power plug to the apparatus,
      the OCP mode sets an OCP threshold amount of power supplied by the PSU to the apparatus, and
      the OCP threshold amount of power set by the OCP mode and supplied by the PSU corresponds to the maximum amount of power supplied by the power plug corresponding to the power setting.

2. The apparatus of claim 1, further comprising:
a BIOS module; and
a switch included in the BIOS module.

3. The apparatus of claim 2, wherein:
the switch further causes the processor to assert and deassert a general-purpose input/output (GPIO) associated with the PSU, and
asserting and deasserting the GPIO enables the PSU to select an output OCP value for the OCP mode.

4. The apparatus of claim 2, further comprising a motherboard embedded controller (EC) coupled to the processor, wherein:
the switch is configured to instruct the EC to operate in one of the plurality of different OCP modes.

5. The apparatus of claim 4, wherein the EC is configured to one of:
use a first OCP threshold amount of power associated with a 15 A input responsive to a first OCP mode of the plurality of different OCP modes being a 15 A mode and the type of the power plug being a national electrical manufacturers association (NEMA) 5P-15 plug; or
use a second OCP threshold amount of power associated with a 20 A input responsive to a second OCP mode of the plurality of different OCP modes being a 20 A mode and the type of the power plug being a NEMA 5P-20 plug.

6. A method, comprising:
receiving, by a processor, a power setting of a plurality of different power settings for a computer system prior to startup of the computer system, wherein each different power setting in the plurality of different power settings corresponds to a type of power plug of a plurality of different types of power plugs that receive power from a power source for powering the computer system;
setting, by the processor in a basic input/output system (BIOS) setup utility prior to startup of the computer system, an overcurrent protection (OCP) mode of a plurality of different OCP modes corresponding to the received power setting, wherein:
the OCP mode set in the BIOS setup utility protects the apparatus from overcurrent in the power supplied by the power source and received via the type of power plug, and
each OCP mode in the plurality of different OCP modes corresponds to a power setting in the plurality of different power settings, and
instructing, by the processor at startup of the computer system, a power supply unit (PSU) of the computer system to operate in the OCP mode set in the BIOS setup utility; and
activating, by the processor, the PSU upon start-up of the computer system,
wherein:
the computer system is configurable for being powered by each different type of power plug,
each different type of power plug is based on a maximum amount of power supplied by the corresponding type of power plug to the computer system,
the OCP mode sets an OCP threshold amount of power supplied by the PSU to the computer system, and
the OCP threshold amount of power set by the OCP mode and supplied by the PSU corresponds to the maximum amount of power supplied by the power plug corresponding to the power setting.

7. The method of claim 6, wherein the computer system comprises a BIOS module and a switch in the BIOS module.

8. The method of claim 7, further comprising:
asserting, by the switch, a general-purpose input/output (GPIO) associated with the PSU.

9. The method of claim 8, further comprising:
deasserting, by the switch, the GPIO associated with the PSU,
wherein asserting and deasserting the GPIO enables the PSU to select an output OCP value for the OCP mode.

10. The method of claim 6, further comprising one of:
at the PSU, using a first OCP threshold amount of power associated with a 15 A input responsive to the OCP mode being a 15 A mode; or
at the PSU, using a second OCP threshold amount of power associated with a 20 A input responsive to the OCP mode being a 20 A mode.

11. The method of claim 6, further comprising:
instructing a motherboard embedded controller (EC) to operate in one of the plurality of different OCP modes.

12. The method of claim 11, further comprising one of:
using, by the EC, a first OCP threshold amount of power associated with a 15 A input responsive to a first OCP mode of the plurality of different OCP modes being a 15 A mode and the type of the power plug being a national electrical manufacturers association (NEMA) 5P-15 plug; or
using, by the EC, a second OCP threshold amount of power associated with a 20 A input responsive to a second OCP mode of the plurality of different OCP modes being a 20 A mode and the type of the power plug being a NEMA 5P-20 plug.

13. A computer system, comprising:
a basic input/output system (BIOS) module, the BIOS module comprising a BIOS power-setting switch configured to switch between a first overcurrent protection (OCP) mode corresponding to a first amount of power received from a power source for powering the computing system and a second OCP mode corresponding to a second amount of power received from the power source for powering the computing system,
wherein:
the first OCP mode or the second OCP mode is set in a BIOS setup utility,
the set first OCP mode protects the computer system from overcurrent in the first amount of power received from the power source, and
the set second OCP mode protects the computer system from overcurrent in the second amount of power received from the power source.

14. The computer system of claim 13, wherein:
the first OCP mode comprises a fifteen-amp (15 A) mode; and
the second OCP mode comprises a twenty-amp (20 A) mode.

15. The computer system of claim 14, further comprising:
a power plug of a plurality of different types of power plugs;
a processor;
a power supply unit (PSU) coupled to the power plug and the processor; and
non-volatile memory storing code that, when executed by the processor, causes the processor to:
receive a power setting of a plurality of power settings for the system that corresponds to the power plug, wherein each different power setting in the plurality of different power settings corresponds to a type of power plug of a plurality of different types of power plugs for the system, set, in the BIOS setup utility prior to startup of the computing device, one of the first OCP mode or the second OCP mode, wherein the one of the first OCP mode or the second OCP mode corresponds to the received power setting, and instruct, at startup of the system, the PSU operate in the one of the first OCP mode or the second OCP mode, wherein:

the computer system is configurable for being powered by each different type of power plug, each different type of power plug is based on a maximum amount of power supplied by the corresponding type of power plug to the computer system, the OCP mode sets an OCP threshold amount of power supplied by the PSU to the computer system, and the OCP threshold amount of power set by the OCP mode and supplied by the PSU corresponds to the maximum amount of power supplied by the power plug corresponding to the power setting.

16. The computer system of claim 15, wherein the BIOS power-setting switch is further configured to cause the processor to assert a general-purpose input/output (GPIO) associated with the PSU.

17. The computer system of claim 16, wherein:

the BIOS power-setting switch is further configured to cause the processor to deassert the GPIO associated with the PSU; and asserting and deasserting the GPIO enables the PSU to select an output OCP value corresponding to the one of the first OCP mode or the second OCP mode.

18. The computer system of claim 15, wherein the PSU is configured to:

use a first OCP threshold amount of power associated with a 15 A input responsive to the first OCP mode; and use a second OCP threshold amount of power associated with a 20 A input responsive to the second OCP mode.

19. The computer system of claim 13, further comprising a motherboard embedded controller (EC) coupled to the processor, wherein:

the BIOS power-setting switch is further configured to instruct the EC to operate in one of the first OCP mode or the second OCP mode.

20. The computer system of claim 19, wherein the EC is configured to one of:

use the first OCP threshold amount of power associated with the 15 A input responsive to the first OCP mode being set and the type of the power plug being a national electrical manufacturers association (NEMA) 5P-15 plug; or use the second OCP threshold amount of power associated with the 20 A input responsive to the second OCP mode being set and the type of the power plug being a NEMA 5P-20 plug.

* * * * *